United States Patent
Zhang et al.

(10) Patent No.: US 12,430,707 B2
(45) Date of Patent: Sep. 30, 2025

(54) METHOD AND APPARATUS FOR 2D REGULARIZED PLANAR PROJECTION OF POINT CLOUD

(71) Applicant: HONOR DEVICE CO., LTD., Shenzhen (CN)

(72) Inventors: Wei Zhang, Shenzhen (CN); Fuzheng Yang, Shenzhen (CN); Yuxin Du, Shenzhen (CN); Jiarun Song, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 44 days.

(21) Appl. No.: 18/266,374

(22) PCT Filed: May 18, 2022

(86) PCT No.: PCT/CN2022/093676
§ 371 (c)(1),
(2) Date: Jun. 9, 2023

(87) PCT Pub. No.: WO2022/247714
PCT Pub. Date: Dec. 1, 2022

(65) Prior Publication Data
US 2024/0112300 A1    Apr. 4, 2024

(30) Foreign Application Priority Data
May 26, 2021   (CN) .......................... 202110578726.3

(51) Int. Cl.
*G06T 3/067*   (2024.01)
(52) U.S. Cl.
CPC ................... *G06T 3/067* (2024.01)
(58) Field of Classification Search
None
See application file for complete search history.

(56) References Cited

U.S. PATENT DOCUMENTS

| 7,804,498 | B1 | 9/2010 | Graham et al. |
| 10,346,998 | B1 * | 7/2019 | Anderberg ................ G06T 7/11 |

(Continued)

FOREIGN PATENT DOCUMENTS

| CN | 103279989 A | 9/2013 |
| CN | 105574905 A | 5/2016 |

(Continued)

OTHER PUBLICATIONS

S. Ko and S. Lee, "3D Point Cloud Matching Based on Its 2D Representation for Visual Odometry," 2018 IEEE International Conference on Image Processing, Applications and Systems (IPAS), Sophia Antipolis, France, 2018, pp. 216-219.

*Primary Examiner* — Joni Hsu
(74) *Attorney, Agent, or Firm* — WOMBLE BOND DICKINSON (US) LLP

(57) ABSTRACT

The present invention discloses a method and an apparatus for 2D regularized planar projection of a point cloud. The method includes: obtaining original point cloud data; initializing a planar structure of 2D projection of the point cloud; calculating horizontal azimuth information of the point cloud based on the original point cloud data; and determining a mapping relationship between the original point cloud data and the planar structure of 2D projection based on the horizontal azimuth information, to obtain a planar structure of 2D regularized projection of the point cloud. In the present invention, a large-scale point cloud may be projected to a 2D regularized planar structure without 2D local search. Therefore, complexity of an algorithm can be reduced, time spent on 2D regularized planar projection of the point cloud can be reduced, and algorithm performance can be improved.

18 Claims, 2 Drawing Sheets

(56) References Cited

U.S. PATENT DOCUMENTS

| | | | |
|---|---|---|---|
| 2005/0057559 A1* | 3/2005 | Komarechka | G01V 1/34 |
| | | | 345/418 |
| 2018/0088214 A1* | 3/2018 | O'Keeffe | G01S 7/4815 |
| 2019/0156520 A1 | 5/2019 | Mammou et al. | |
| 2019/0195998 A1 | 6/2019 | Campbell | |
| 2022/0011102 A1* | 1/2022 | Yamamoto | G01C 21/165 |
| 2022/0353531 A1* | 11/2022 | Hur | H04N 19/136 |
| 2023/0260153 A1* | 8/2023 | Saric | E21D 9/004 |
| | | | 382/103 |
| 2024/0094337 A1* | 3/2024 | Fernandez | G01S 7/4873 |

FOREIGN PATENT DOCUMENTS

| | | |
|---|---|---|
| CN | 109509143 A | 3/2019 |
| CN | 110428372 A | 11/2019 |
| CN | 111009011 A | 4/2020 |
| CN | 112150595 A | 12/2020 |
| WO | 2016185637 A1 | 11/2016 |
| WO | 2019013430 A1 | 1/2019 |

* cited by examiner

METHOD AND APPARATUS FOR 2D REGULARIZED PLANAR PROJECTION OF POINT CLOUD

CROSS-REFERENCE TO RELATED APPLICATIONS

This application is a national stage of International Application No. PCT/CN2022/093676, filed on May 18, 2022, which claims priority to Chinese Patent Application No. 202110578726.3, filed on May 26, 2021. The disclosures of both of the aforementioned applications are hereby incorporated by reference in their entireties.

TECHNICAL FIELD

The present invention pertains to the field of point cloud data processing technologies, and in particular, to a method and an apparatus for 2D regularized planar projection of a point cloud.

BACKGROUND

With the development of computer technologies, 3D point cloud data has been widely applied to virtual reality, augmented reality, autonomous driving, environment modeling, and the like. However, due to impact such as a measurement error of a device, a surrounding environment, and the like, obtained large-scale original point cloud data is often confronted with many problems, such as uneven distribution and sparsity, which cause a difficulty in subsequent processing of point cloud data.

Based on this, a method for 2D regularized planar projection of a large-scale point cloud is proposed in the prior art, which provides, for application of a point cloud, a representation form used for performing data processing easily. A general process of the method is as follows: first, initializing a planar structure of 2D projection of the point cloud; and second, determining a mapping relationship between the point cloud and the planar structure of 2D projection, to obtain a planar structure of 2D regularized projection corresponding to the point cloud. A key step is: determining the mapping relationship between the point cloud and the planar structure of 2D projection, which directly affects projection accuracy.

At present, in an existing method, the planar structure of 2D projection is mainly locally searched for a point in the point cloud, to find an optimal matching pixel, thereby determining the mapping relationship between the point cloud and the planar structure of 2D projection.

However, in this method, 2D local search needs to be performed on every point in the point cloud in the planar structure of 2D projection. For large-scale point cloud data, this undoubtedly leads to relatively high complexity of an algorithm. Therefore, excessively much time is spent on the 2D regularized planar projection of the point cloud, thereby affecting algorithm performance.

SUMMARY

To resolve the foregoing problems in the prior art, the present invention provides a method and an apparatus for 2D regularized planar projection of a point cloud. The technical problems are resolved in the present invention in the following technical solutions.

A method for 2D regularized planar projection of a point cloud is provided. The method includes:

obtaining original point cloud data;

initializing a planar structure of 2D projection of the point cloud;

calculating horizontal azimuth information of the point cloud based on the original point cloud data; and determining a mapping relationship between the original point cloud data and the planar structure of 2D projection based on the horizontal azimuth information, to obtain a planar structure of 2D regularized projection of the point cloud.

In an embodiment of the present invention, a formula for calculating the horizontal azimuth information is as follows:

$$\varphi = \arctan\frac{x}{y};$$

$\varphi$ represents horizontal azimuth information of a current point in the original point cloud data, and x and y are Cartesian coordinate components of the current point respectively.

In an embodiment of the present invention, the determining a mapping relationship between the original point cloud data and the planar structure of 2D projection based on the horizontal azimuth information includes:

determining a row index of the original point cloud data in the planar structure of 2D projection; and determining a column index of the original point cloud data in the planar structure of 2D projection based on the horizontal azimuth information.

In an embodiment of the present invention, the determining a column index of the original point cloud data in the planar structure of 2D projection based on the horizontal azimuth information includes:

establishing a relationship between the horizontal azimuth information and original collection azimuth information of the point cloud, and obtaining a corresponding relational expression;

calculating the original collection azimuth information of the point cloud based on the relational expression; and calculating the column index of the original point cloud data in the planar structure of 2D projection based on the original collection azimuth information.

In an embodiment of the present invention, the relational expression between the horizontal azimuth information and the original collection azimuth information of the point cloud is as follows:

$$\varphi = \varphi_0 - \alpha - \arctan\frac{H_o}{r};$$

$\varphi$ represents horizontal azimuth information of a current point in the original point cloud data, $\varphi_0$ represents original collection azimuth information of the current point, $\alpha$ represents a horizontal correction angle of a laser to which the current point belongs, $H_o$ represents a horizontal offset of the laser to which the current point belongs, and r represents depth information of the current point.

In an embodiment of the present invention, the relational expression between the horizontal azimuth information and the original collection azimuth information of the point cloud is as follows:

$$\varphi = \varphi_0 - \alpha - \arccos\left(-\frac{H_o}{r}\right) + 90°;$$

$\varphi$ represents horizontal azimuth information of a current point in the original point cloud data, $\varphi_0$ represents original collection azimuth information of the current point, $\alpha$ represents a horizontal correction angle of a laser to which the current point belongs, $H_o$ represents a horizontal offset of the laser to which the current point belongs, and r represents depth information of the current point.

In an embodiment of the present invention, a formula for calculating a column index of the original point cloud data in the planar structure of 2D projection is as follows:

$$j = \text{round}\left(\frac{\varphi_0 + 180°}{\varphi_{speed}}\right);$$

j represents a column index of a current point in the original point cloud data in the planar structure of 2D projection, $\varphi_0$ represents original collection azimuth information of the current point, $\varphi_{speed}$ and speed represents a sampling angle resolution of the laser.

Another embodiment of the present invention provides an apparatus for 2D regularized planar projection of a point cloud, including:
- a data obtaining module, configured to obtain original point cloud data;
- an initializing module, configured to initialize a planar structure of 2D projection of the point cloud;
- a calculating module, configured to calculate horizontal azimuth information of the point cloud based on the original point cloud data; and
- a mapping module, configured to determine a mapping relationship between the original point cloud data and the planar structure of 2D projection based on the horizontal azimuth information, to obtain a planar structure of 2D regularized projection of the point cloud.

Beneficial effects of the present invention are as follows.

1. In the present invention, the mapping relationship between the original point cloud data and the planar structure of 2D projection is determined through the horizontal azimuth information of the point cloud, and a large-scale point cloud may be projected to a 2D regularized planar structure without 2D local search. Therefore, complexity of an algorithm can be reduced, time spent on 2D regularized planar projection of the point cloud can be decreased, and algorithm performance can be improved.

2. In the present invention, a column index of the cloud point projected to a 2D planar structure is determined by the relationship between the horizontal azimuth information and the original collection azimuth information of the point cloud. Accordingly, the point cloud is regularly corrected in the vertical direction and horizontal direction, and representation of strong correlation of the point cloud on the planar structure of 2D projection is obtained. Therefore, sparsity existing in a 3D representation structure can be prevented, and spatial correlation of the point cloud is better reflected, thereby providing, for application of the point cloud, a representation form used for performing data processing easily.

The present invention is further described below in detail with reference to the accompanying drawings and embodiments.

DESCRIPTION OF EMBODIMENTS

The present invention is further described in detail with reference to the following specific embodiments, but implementations of the present invention are not limited to thereto.

Embodiment 1

Figure 1:
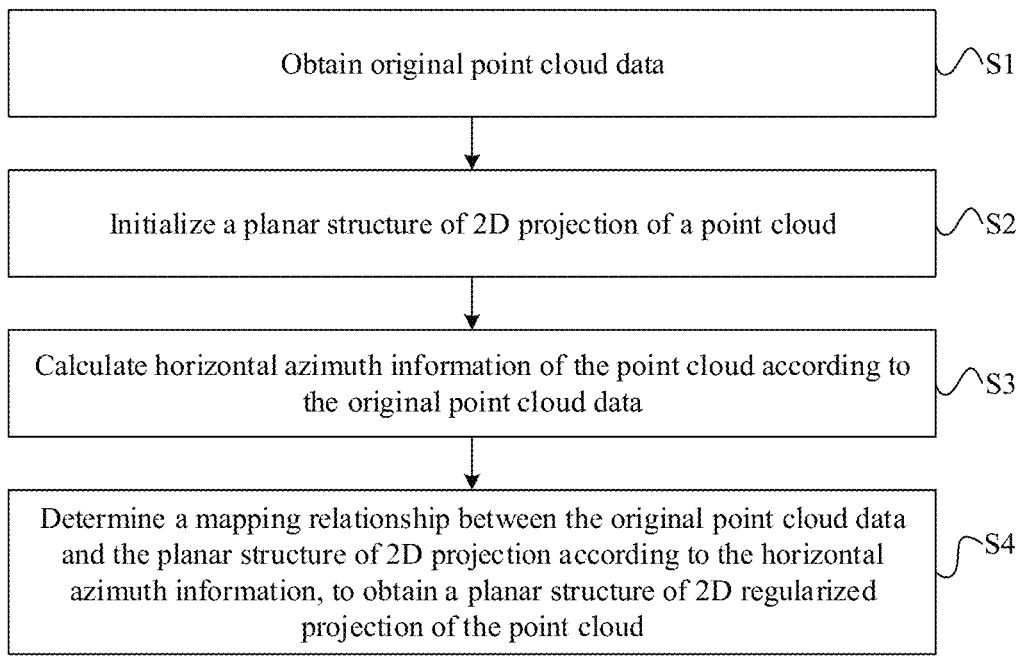
FIG. 1 is a flowchart of a method for 2D regularized planar projection of a point cloud according to an embodiment of the present invention.

FIG. 1 is a flowchart of a method for 2D regularized planar projection of a point cloud according to an embodiment of the present invention. The method includes the following steps.

Step 1: Obtain original point cloud data.

Specifically, the original point cloud data usually includes a group of 3D spatial points. Each spatial point records its geometric position information, as well as additional attribute information such as a color, reflectivity, and a normal. The geometric position information of a point cloud is generally expressed based on a Cartesian coordinate system, namely, is expressed by x, y, and z coordinates of a point. The original point cloud data may be obtained through scanning by a laser radar or a public data set provided by various platforms.

In this embodiment, it is assumed that geometric position information of the obtained original point cloud data is expressed based on the Cartesian coordinate system. It should be noted that a method for expressing the geometric position information of the original point cloud data is not limited to a Cartesian coordinate.

Step 2: Initialize a planar structure of 2D projection of a point cloud.

Specifically, in this embodiment, when the planar structure of 2D projection of a point cloud is initialized, initialization is implemented by using a regularization parameter. The regularization parameter includes a calibration parameter of the laser radar or a parameter obtained through optimal estimation or data fitting.

The calibration parameter of the laser radar is carefully measured by a manufacturer and provided to a consumer as one piece of necessary data, such as a collection range of the laser radar, a sampling angle resolution $\varphi_{speed}$ or a quantity of sampling points of each laser (laser scanner) of the laser radar, a distance correction factor of each laser, offset information $V_o$ and $H_o$ of the laser in a vertical direction and a horizontal direction, and offset information $\theta_0$ and $\alpha$ of the laser in a pitch angle and a horizontal azimuth angle.

A planar structure of 2D regularized projection of the point cloud is a data structure including pixels of M rows and N columns, and a point in the original point cloud data corresponds to a pixel in the data structure after projection. Resolution of a plane of 2D regularized projection may be obtained by the regularization parameter. For example, assuming that the resolution of a plane of 2D regularized projection is M×N, M may be initialized by using a quantity of lasers in the regularization parameters, and N may be initialized by using the sampling angle resolution $\varphi_{speed}$ of the laser or a quantity of sampling points per laser point NumPerLaser. A specific formula is shown below. Finally, initialization of the planar structure of 2D projection may be completed, and a planar structure containing M×N pixels may be obtained.

$$M = laserNum;$$
$$N = \frac{360°}{\varphi_{speed}} \text{ or } N = \text{point } NumPerLaser.$$

Step 3: Calculate horizontal azimuth information of the point cloud based on the original point cloud data.

For example, in this embodiment, the following formula may be used to calculate the horizontal azimuth information of the point cloud:

$$\varphi = \arctan\frac{x}{y};$$

$\varphi$ represents horizontal azimuth information of a current point in the original point cloud data, and x and y are Cartesian coordinate components of the current point respectively.

In addition, it should be noted that calculation of a horizontal azimuth angle may be adaptively changed based on a representation form of the original point cloud data, which is not specifically limited in this embodiment.

Step 4: Determine a mapping relationship between the original point cloud data and the planar structure of 2D projection based on the horizontal azimuth information, to obtain a planar structure of 2D regularized projection of the point cloud.

In this embodiment, the determining a mapping relationship between the original point cloud data and the planar structure of 2D projection may be performed in two steps.

First, a row index of the original point cloud data in the planar structure of 2D projection is determined.

Specifically, a row index i of each point in the original point cloud data in the planar structure of 2D projection may be determined in an existing method. A solution formula is as follows:

$$i = \arg\min_{k=1...laserNum} |z - V_o^k - r \times \tan\theta_o^k|;$$

z is a Cartesian coordinate component of a current point, $r_j$ is depth information of the current point and $r = \sqrt{x^2+y^2}$, laserNum represents a quantity of lasers included in the laser radar, $V_o^k$ is offset information of a $k^{th}$ laser along a vertical direction, $\theta_o^k$ is offset information of a $k^{th}$ laser along a pitch angle, and both $V_o^k$ and $\theta_o^k$ are calibration parameters of the laser radar.

Because this formula is an optimization problem, laser-Num absolute errors $|z - V_o^k - r \times \tan\theta_o^k|$ need to be calculated based on the foregoing formula in practical engineering, where k=1, . . . , laserNum. A serial number k−1 that minimizes the absolute error is the row index i of a corresponding pixel of the current point in the planar structure of 2D projection.

Then, a column index of the original point cloud data in the planar structure of 2D projection is determined based on the horizontal azimuth information, which specifically includes the following.

(a) The relationship between the horizontal azimuth information of the point cloud and original collection azimuth information is established, and a corresponding relational expression is obtained.

In this embodiment, the relationship between the horizontal azimuth information and original collection azimuth information may be determined from a perspective of algebra based on a collection principle of the laser radar.

Figure 2:
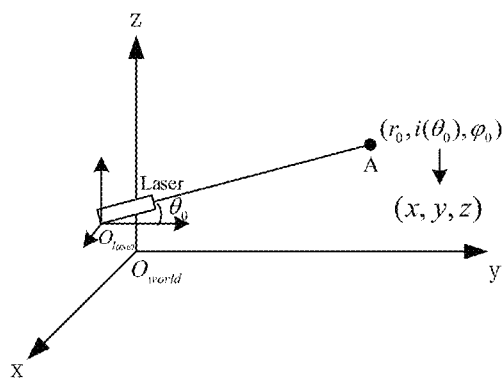
FIG. 2 is a schematic diagram of calibration of a laser radar according to an embodiment of the present invention.

Specifically, the laser radar includes a plurality of laser combinations arranged and distributed along both sides of a central axis. Each laser has a fixed pitch angle and may be considered as a relatively independent collection system. These lasers rotate 360° around the central axis of the laser radar jointly, perform sampling at intervals at a fixed rotation angle during rotation, and return original collection information of a sampling point, namely, original collection distance information $r_0$ of the sampling point, an index number $i(\theta_0)$ of a laser to which the sampling point belongs, and original collection azimuth information $\varphi_0$, and the information is expressed based on a local cylindrical coordinate system whose corresponding laser is an original point. However, to facilitate subsequent processing of the point cloud, original collection data of the point cloud needs to be converted into the Cartesian coordinate system with a bottom of the laser radar used as a same origin, and a point cloud of the laser radar in a same Cartesian coordinate system, namely, a point cloud finally collected by a device, is formed. The conversion is calibration of the laser radar. As shown in FIG. 2, FIG. 2 is a schematic diagram of calibration of a laser radar according to an embodiment of the present invention.

A formula for calibrating the laser radar is as follows. Through this formula, original collection information $(r_0, i(\theta_0), \varphi_0)$ of a point is converted into Cartesian coordinates (x, y, z) In the original collection information of the point, $r_0$ is original collection distance information of the point, $i(\theta_0)$ is an index number of a laser to which the point belongs, and $\varphi_0$ is original collection azimuth information of the point:

$$\beta = \varphi_0 - \alpha;$$

$$x = (r_0 + D_{corr}) \cdot \cos\theta_0 \cdot \sin\beta - H_o \cdot \cos\beta;$$

$$y = (r_0 + D_{corr}) \cdot \cos\theta_0 \cdot \cos\beta - H_o \cdot \sin\beta;$$

$$z = (r_0 + D_{corr}) \cdot \sin\theta_0 + V_o;$$

$D_{corr}$ is a distance correction factor of the laser to which the point belongs, namely, an $i^{th}$ laser, of the laser radar, $V_o$ is a vertical offset of the laser to which the point belongs, $H_o$ is a horizontal offset of the laser to which the point belongs, $\theta_0$ is a vertical elevation angle of the laser to which the point belongs, and $\alpha$ is a horizontal correction angle of the laser to which the point belongs.

All the parameters are calibration parameters, namely, regularization parameters, of the laser.

Next, it is assumed that $(r_0+D_{corr})\cdot\cos\theta_0 \approx \sqrt{x^2+y^2}=r$ projected on an x-y plane, r represents depth information of a current point (x, y, z). In this case, $x = r\cdot\sin\beta - H_o\cdot\cos\beta$;

$y = r\cdot\cos\beta + H_o\cdot\sin\beta$;

then, an auxiliary angle formula is used for conversion, to obtain:

$$x = r\cdot\sin\beta - H_o\cdot\cos\beta = \sqrt{r^2 + H_o^2} \cdot \sin\left(\beta - \arctan\frac{H_o}{r}\right);$$

$$y = r\cdot\cos\beta + H_o\cdot\sin\beta = \sqrt{r^2 + H_o^2} \cdot \cos\left(\beta - \arctan\frac{H_o}{r}\right).$$

Horizontal azimuth information φ of the point calculated by x and y is as follows:

$$\varphi = \arctan\frac{x}{y} = \arctan\left(\frac{r\cdot\sin\beta - H_o\cdot\cos\beta}{r\cdot\cos\beta + H_o\cdot\sin\beta}\right) = \arctan\left(\tan\left(\beta - \arctan\frac{H_o}{r}\right)\right) = \beta - \arctan\frac{H_o}{r}$$

Finally, $\beta=\varphi_0-\alpha$ is substituted to the foregoing equation, to obtain a relational expression between the horizontal azimuth information φ and original collection azimuth information $\varphi_0$ of a point cloud:

$$\varphi = \varphi_0 - \alpha - \arctan\frac{H_o}{r};$$

r is depth information of a point in the point cloud, $H_o$ is the horizontal offset of the laser to which the point belongs, α is the horizontal correction angle of the laser to which the point belongs, and both $H_o$ and α are calibration parameters, namely, regularization parameters, of the laser.

In another embodiment of the present invention, the relationship between the horizontal azimuth information and the original collection azimuth information may also be determined from the perspective of geometry.

Figure 3:
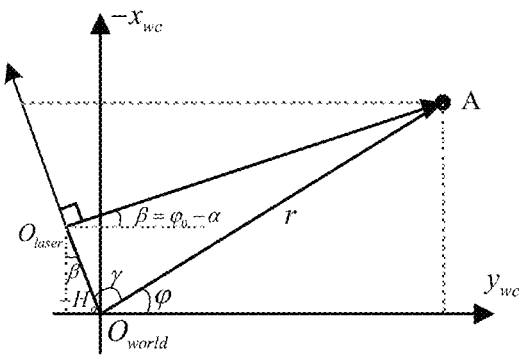
FIG. 3 is a schematic diagram of calibration of a laser radar in an x-y plane according to an embodiment of the present invention.

Specifically, the laser radar is calibrated during collection of the point cloud, and original collection information of the laser expressed in a local cylindrical coordinate system is converted into a Cartesian coordinate system with a bottom of the laser radar used as a same original point, and a point cloud of the laser radar in a same Cartesian coordinate system, namely, a point cloud finally collected by the device, is formed, as shown in FIG. 2. However, because an azimuth of the point cloud is expressed in the x-y plane of the Cartesian coordinate system, FIG. 3 is further obtained from FIG. 2. FIG. 3 is a schematic diagram of calibration of a laser radar in the x-y plane according to embodiment of the present invention.

It can be obtained, through deduction, from FIG. 3 that $$\gamma = \arccos\left(\frac{|O_{world}O_{laser}|}{r}\right) = \arccos\left(\frac{-H_0}{r}\right),$$

where $r=\sqrt{x^2+y^2}$ is depth information of a point, and $H_o$ is a horizontal offset of a laser to which the point belongs.

Because $H_o$ is a negative value, $|O_{world}O_{laser}|=-H_o$. Further, $90°-\beta=180°-\gamma-\varphi$, and then a relational expression between horizontal azimuth information and original collection azimuth information $\varphi_0$ of a point cloud may be obtained by substituting $\beta=\varphi_0-\alpha$ and $$\gamma = \arccos\left(\frac{-H_0}{r}\right) : \varphi = \varphi_0 - \alpha - \arccos\left(-\frac{H_o}{r}\right) + 90°.$$

r is depth information of a point in the point cloud, $H_o$ is the horizontal offset of the laser to which the point belongs, α is a horizontal correction angle of the laser to which the point belongs, and both $H_o$ and α are calibration parameters, namely, regularization parameters, of the laser. It should be noted that, because approximate treatment is used in algebraic derivation, relational expressions obtained in two methods are different in form, but with almost same relation curves.

(b) The original collection azimuth information of the point cloud is calculated based on the foregoing relational expression.

Specifically, when a relationship between the horizontal azimuth information and the original collection azimuth information is obtained in an algebraic method, a formula for calculating the original collection azimuth information of the point cloud is as follows:

$$\varphi_0 = \varphi + \alpha + \arctan\frac{H_o}{r}.$$

When the relationship between the horizontal azimuth information and the original collection azimuth information is obtained in a geometric method, the formula for calculating the original collection azimuth information of the point cloud is as follows:

$$\varphi_0 = \varphi - 90° + \alpha + \arccos\left(-\frac{H_o}{r}\right).$$

(c) A column index of the original point cloud data in the planar structure of 2D projection is calculated based on the original collection azimuth information. A calculation formula is as follows:

$$j = \text{round}\left(\frac{\varphi_0 + 180°}{\varphi_{speed}}\right);$$

j represents a column index of a current point in the original point cloud data in the planar structure of 2D projection, $\varphi_0$ represents original collection azimuth information of the current point, and $\varphi_{speed}$ represents a sampling angle resolution of the laser.

Figure 4:
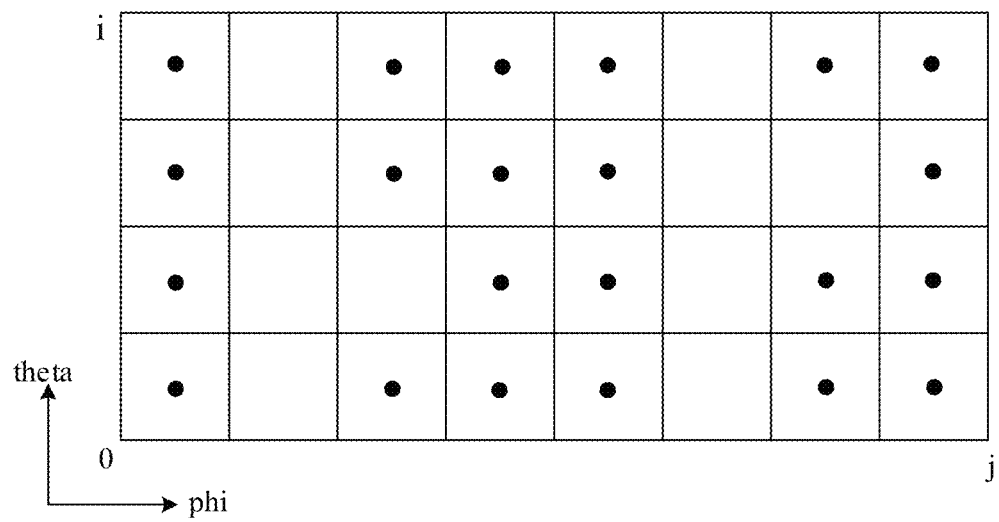
FIG. 4 is a schematic diagram of a planar structure of 2D projection of a point cloud according to an embodiment of the present invention.

Finally, through this embodiment, a corresponding pixel (i, j) of the current point in the planar structure of 2D projection is obtained, and therefore a mapping relationship between the point cloud and the planar structure of 2D projection is determined. After the foregoing operations are completed for all points in the point cloud, namely, 2D regularized planar projection of the point cloud is completed, as shown in FIG. 4. FIG. 4 is a schematic diagram of a planar structure of 2D projection of a point cloud according to an embodiment of the present invention. Each point in the point cloud is mapped to a corresponding pixel in the structure.

In this embodiment, a mapping relationship between an original point cloud data and the planar structure of 2D projection is determined through horizontal azimuth information of the point cloud, and a large-scale point cloud may be projected to a 2D regularized plane structure without 2D local search. Therefore, complexity of an algorithm can be reduced, time spent on 2D regularized planar projection of the point cloud can be decreased, and algorithm performance can be improved.

Furthermore, in this embodiment, a column index of the cloud point projected to a 2D planar structure is determined by a relationship between horizontal azimuth information and original collection azimuth information of the point cloud. Accordingly, the point cloud is regularly corrected in a vertical direction and horizontal direction, and representation of strong correlation of the point cloud on the planar structure of 2D projection is obtained. Therefore, sparsity existing in a 3D representation structure can be prevented, and spatial correlation of the point cloud is better reflected, thereby providing, for application of the point cloud, a representation form used for performing data processing easily.

Embodiment 2

Figure 5:
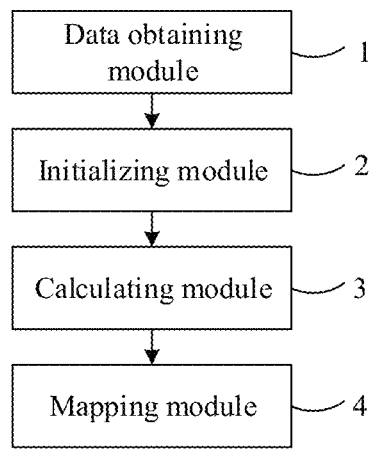
FIG. 5 is a schematic structural diagram of an apparatus for 2D regularized planar projection of a point cloud according to an embodiment of the present invention.

Based on the foregoing Embodiment 1, this embodiment provides an apparatus for the 2D regularized planar projection of the point cloud. FIG. 5 is a schematic structural diagram of an apparatus for 2D regularized planar projection of a point cloud according to an embodiment of the present invention. The apparatus includes:

a data obtaining module 1, configured to obtain original point cloud data;

an initializing module 2, configured to initialize a planar structure of 2D projection of a point cloud;

a calculating module 3, configured to calculate horizontal azimuth information of the point cloud based on the original point cloud data; and a mapping module 4, configured to determine a mapping relationship between the original point cloud data and the planar structure of 2D projection based on the horizontal azimuth information, to obtain a planar structure of 2D regularized projection of the point cloud.

The apparatus provided in this embodiment can implement the method for 2D regularized planar projection of a point cloud provided in the foregoing Embodiment 1. Details are not described herein again.

The foregoing are further detailed descriptions of the present invention with reference to specific preferred implementations, and it cannot be considered that the implementations of the present invention are only limited to these descriptions. A person of ordinary skill in the art to which the present invention belongs may make simple deductions or replacements without departing from the concept of the present invention, all of which shall be considered as falling within the protection scope of the present invention

What is claimed is:

1. A method, performed by a computing device, for 2D regularized planar projection of a point cloud, comprising:
   obtaining original point cloud data;
   initializing a planar structure of 2D projection of the point cloud;
   calculating horizontal azimuth information of the point cloud based on the original point cloud data; and
   determining a mapping relationship between the original point cloud data and the planar structure of 2D projection based on the horizontal azimuth information, to obtain a planar structure of 2D regularized projection of the point cloud, wherein determining the mapping relationship comprises determining a column index of the original point cloud data in the planar structure of 2D projection based on the horizontal azimuth information, comprising
   establishing a relationship between the horizontal azimuth information of the point cloud and an original collection azimuth information of the point cloud, and obtaining a corresponding relational expression, wherein the relational expression between the horizontal azimuth information of the point cloud and the original collection azimuth information of the point cloud is as follows:

$$\varphi = \varphi_0 - \alpha - \arctan\frac{H_o}{r};$$

or $$\varphi = \varphi_0 - \alpha - \arccos\left(-\frac{H_o}{r}\right) + 90°;$$

wherein $\varphi$ represents the horizontal azimuth information of a current point in the original point cloud data, $\varphi_0$ represents the original collection azimuth information of the current point, $\alpha$ represents a horizontal correction angle of a laser to which the current point belongs, $H_o$ represents a horizontal offset of the laser to which the current point belongs, and r represents depth information of the current point.

2. The method according to claim 1, wherein the original point cloud data includes a group of 3D spatial points, wherein each of the 3D spatial points is associated with respective geometric position information, and the geometric position information of each of the 3D spatial points is expressed based on a Cartesian coordinate system.

3. The method according to claim 1, wherein
   the planar structure of 2D projection of the point cloud is a data structure including pixels of M rows and N columns, and a point in the original point cloud data corresponds to a pixel in the data structure after projection.

4. The method according to claim 3, wherein M is initialized by using a quantity of lasers in the regularization parameters laserNum, and N is initialized by using a sampling angle resolution $\varphi_{speed}$ of the laser or a quantity of sampling points per laser $$M = laserNum;$$

$$N = \frac{360°}{\varphi_{speed}} \text{ or } N = \text{point } NumPerLaser.$$

5. The method according to claim 1, wherein calculating the horizontal azimuth information of the point cloud based on the original point cloud data is based on:

$$\varphi = \arctan x/y;$$

wherein φ represents horizontal azimuth information of the current point in the original point cloud data, and x and y are Cartesian coordinate components of the current point respectively.

6. The method according to claim 1, wherein the determining the mapping relationship between the original point cloud data and the planar structure of 2D projection based on the horizontal azimuth information further comprises:
determining a row index of the original point cloud data in the planar structure of 2D projection.

7. The method according to claim 6, wherein the determining the column index of the original point cloud data in the planar structure of 2D projection based on the horizontal azimuth information further comprises:
calculating the original collection azimuth information of the point cloud based on the relational expression; and
calculating the column index of the original point cloud data in the planar structure of 2D projection based on the original collection azimuth information.

8. The method according to claim 7, wherein calculating the column index of the original point cloud data in the planar structure of 2D projection is based on:

$$j = \text{round}\left(\frac{\varphi_0 + 180°}{\varphi_{speed}}\right);$$

wherein j represents a column index of a current point in the original point cloud data in the planar structure of 2D projection, $\varphi_0$ represents the original collection azimuth information of the current point, and $\varphi_{speed}$ represents a sampling angle resolution of the laser.

9. The method according to claim 6, wherein the determining the row index of the original point cloud data in the planar structure of 2D projection comprises: the row index i of the current point in the original point cloud data in the planar structure of 2D projection is determined as follows:

$$i = \arg\min_{k=1...laserNum} |z - V_o^k - r \times \tan\theta_o^k|;$$

wherein z is a Cartesian coordinate component of the current point, r is depth information of the current point and $r=\sqrt{x^2+y^2}$, laserNum represents a quantity of lasers included in a laser radar, $V_o^k$ is offset information of a $k^{th}$ laser along a vertical direction, $\theta_o^k$ is offset information of a $k^{th}$ laser along a pitch angle, and both $V_o^k$ and $\theta_o^k$ and are calibration parameters of the laser radar.

10. A device for 2D regularized planar projection of a point cloud, the device comprising:
a processor; and
a memory storing instruction that, when executed by the processor, cause the device to perform operations comprising:
obtaining original point cloud data;
initializing a planar structure of 2D projection of the point cloud;
calculating horizontal azimuth information of the point cloud based on the original point cloud data; and
determining a mapping relationship between the original point cloud data and the planar structure of 2D projection based on the horizontal azimuth information, to obtain a planar structure of 2D regularized projection of the point cloud, wherein determining the mapping relationship comprises determining a column index of the original point cloud data in the planar structure of 2D projection based on the horizontal azimuth information, including establishing a relationship between the horizontal azimuth information of the point cloud and an original collection azimuth information of the point cloud, and obtaining a corresponding relational expression, wherein calculating the column index of the original point cloud data in the planar structure of 2D projection is based on:

$$j = \text{round}\left(\frac{\varphi_0 + 180°}{\varphi_{speed}}\right);$$

wherein j represents the column index of a current point in the original point cloud data in the planar structure of 2D projection, $\varphi_0$ represents the original collection azimuth information of the current point, and $\varphi_{speed}$ represents a sampling angle resolution of a laser to which the current point belongs.

11. The device according to claim 10, wherein the original point cloud data includes a group of 3D spatial points, wherein each of the 3D spatial points is associated with respective geometric position information, and the geometric position information of each of the 3D spatial points is expressed based on a Cartesian coordinate system.

12. The device according to claim 10, wherein
the planar structure of the 2D projection of the point cloud is a data structure including pixels of M rows and N columns, and a point in the original point cloud data corresponds to a pixel in the data structure after projection.

13. The device according to claim 10, wherein calculating the horizontal azimuth information is based on:

$$\varphi = \arctan x/y;$$

wherein φ represents horizontal azimuth information of a current point in the original point cloud data, and x and y are Cartesian coordinate components of the current point respectively.

14. The device according to claim 10, wherein the determining the mapping relationship between the original point cloud data and the planar structure of 2D projection based on the horizontal azimuth information further comprises:
determining a row index of the original point cloud data in the planar structure of 2D projection.

15. The device according to claim 14, wherein the determining the column index of the original point cloud data in the planar structure of 2D projection based on the horizontal azimuth information further comprises:
calculating the original collection azimuth information of the point cloud based on the relational expression; and
calculating the column index of the original point cloud data in the planar structure of 2D projection based on the original collection azimuth information.

16. The device according to claim 15, wherein the relational expression between the horizontal azimuth information of the point cloud and the original collection azimuth information of the point cloud is as follows:

$$\varphi = \varphi_0 - \alpha - \arctan\frac{H_o}{r};$$

wherein φ represents the horizontal azimuth information of the current point in the original point cloud data, $\varphi_0$ represents the original collection azimuth information of the current point, α represents a horizontal correction angle of the laser to which the current point belongs, $H_o$ represents a horizontal offset of the laser to which the current point belongs, and r represents depth information of the current point.

17. The device according to claim 15, wherein the relational expression between the horizontal azimuth information of the point cloud and the original collection azimuth information of the point cloud is as follows:

$$\varphi = \varphi_0 - \alpha - \arccos\left(-\frac{H_o}{r}\right) + 90°;$$

wherein φ represents the horizontal azimuth information of the current point in the original point cloud data, $\varphi_0$ represents the original collection azimuth information of the current point, α represents a horizontal correction angle of the laser to which the current point belongs, $H_o$ represents a horizontal offset of the laser to which the current point belongs, and r represents depth information of the current point.

18. A non-transitory computer-readable medium storing machine executable instructions that, when executed by a processing device, causes the processing device to perform operations for 2D regularized planar projection of a point cloud, comprising:
obtaining original point cloud data;
initializing a planar structure of 2D projection of the point cloud;
calculating horizontal azimuth information of the point cloud based on the original point cloud data; and
determining a mapping relationship between the original point cloud data and the planar structure of 2D projection based on the horizontal azimuth information, to obtain a planar structure of 2D regularized projection of the point cloud, wherein determining the mapping relationship comprises determining a column index of the original point cloud data in the planar structure of 2D projection based on the horizontal azimuth information, comprising
establishing a relationship between the horizontal azimuth information of the point cloud and an original collection azimuth information of the point cloud, and obtaining a corresponding relational expression, wherein the relational expression between the horizontal azimuth information of the point cloud and the original collection azimuth information of the point cloud is as follows:

$$\varphi = \varphi_0 - \alpha - \arccos(-H_o/r) + 90°;$$

wherein φ represents the horizontal azimuth information of a current point in the original point cloud data, $\varphi_0$ represents the original collection azimuth information of the current point, α represents a horizontal correction angle of a laser to which the current point belongs, $H_o$ represents a horizontal offset of the laser to which the current point belongs, and r represents depth information of the current point.

* * * * *